United States Patent [19]

Charneski et al.

[11] 4,214,121

[45] Jul. 22, 1980

[54] ELECTRICAL JOINT COMPOUND

[76] Inventors: Mitchell D. Charneski, 25900 Mulberry Dr., Southfield, Mich. 48034; James K. Kelley, 9188 Grafton Rd., Carleton, Mich. 48117; Frank J. Gazdecki, 11243 Wynn Dr., Pinckney, Mich. 48169

[21] Appl. No.: 882,994

[22] Filed: Mar. 3, 1978

Related U.S. Application Data

[63] Continuation-in-part of Ser. No. 648,453, Jan. 12, 1976, abandoned.

[51] Int. Cl.[2] .......... H02G 15/00

[52] U.S. Cl. .......... 174/84 C; 252/512; 260/37 M; 339/276 C

[58] Field of Search .......... 252/512; 260/37 M; 339/276 C, 115 C; 174/84 C

[56] References Cited

U.S. PATENT DOCUMENTS

| | | | |
|---|---|---|---|
| 2,818,346 | 12/1957 | Gossman | 252/512 X |
| 2,901,722 | 8/1959 | Arnott | 252/512 X |
| 3,243,758 | 3/1966 | Frant et al. | 174/76 X |
| 3,332,867 | 7/1967 | Miller et al. | 252/512 X |
| 3,491,056 | 1/1970 | Saunders et al. | 260/42.22 X |
| 3,709,835 | 1/1973 | Forster | 252/512 X |

*Primary Examiner*—Roy N. Envall, Jr.
*Attorney, Agent, or Firm*—Whittemore, Hulbert & Belknap

[57] ABSTRACT

The present invention relates to an electrical joint compound for use in tubular compression connectors generally of aluminum or copper, and is particularly useful for joining large, stranded or solid, underground, electrical power cable and terminations of cable in high-voltage potheads. The electrical joint compound is a thermosetting hardenable resin system such for example as epoxy or polyester, which contains sufficient fine metal particles to make the resin semi-conducting and also contains coarse metal particles of irregular shape which because of their size and shape break through any oxide surface such as occurs particularly on aluminum conductors during compression, and allow a metal-to-metal contact to be made between connector and conductor strands and between contiguous conductor strands. The combination of the coarse and the fine particles in a hard, semi-conducting resin provide a synergistic effect which gives a stable, low resistance, compression connector joint not heretofore available. The present invention makes it possible to join aluminum and aluminum to copper power cable in sizes as large as 3 million circular mil with compression connectors.

13 Claims, 3 Drawing Figures

ELECTRICAL JOINT COMPOUND

CROSS REFERENCE TO RELATED APPLICATION

The present application is a continuation-in-part of our prior co-pending application, Ser. No. 648,453 filed Jan. 12, 1976, now abandoned.

BRIEF SUMMARY OF THE INVENTION

Heretofore, joining large aluminum underground power cable to aluminum or copper power cable with compression connectors was not feasible because of premature failure of the connector joint under electrical current loading. Unlike the long and bulky compression connectors used on bare overhead power lines where space is not a premium, underground compression connectors must be short to keep manhole size small and to reduce the time required to insulate the joint with hand-wrapped tape or other insulating materials. Overhead line connectors receieve appreciable cooling from air currents whereas commonly used paper or plastic insulation restricts the cooling of underground cable joints. Metal particle-filled grease joint compounds used in overhead line compression connectors are not used for underground cable for several reasons. First, its use is precluded because of the possiblity of migration of the compound into the paper or along the insulation resulting in voltage puncture of the insulation from ionization. Secondly, joint compounds of grease do not offer much improvement over no compound because grease will move under pressure and therefore does not constrain relative movement of connector and conductor strands whereas hardenable resins such as epoxy do.

It is well known that the non-conducting oxide film on aluminum and the tendency for aluminum to cold flow under pressure and thermal cycling will cause compression connector joints to deteriorate. As the size of the cable to be joined becomes larger, the above effects are multiplied. In joining aluminum to copper cable, the thermal movement within the compression connector is aggravated because of the differences in the thermal coefficients of expansion of the two different metals. (Copper—$9\times10^{-6}$ inch per inch length per degree Fahrenheit; aluminum—$13\times10^{-6}$ inch per inch length per degree Fahrenheit). These effects are mitigated by the present joint compound. Coarse particles of metal of irregular shape with sharp edges in the range of 10 to 100 mesh included in the resin initially assist in obtaining a low electrical resistance connection during the compression and constraints placed by the hard epoxy or other resin on relative movement of contact surfaces maintain the low resistance. The coarse metal particles break through any non-conductive oxide skin initially during the compression and expose the conducting bare metal contact areas of the connector to those of the strands and of the strands to each other. A multiplicity of metal-to-metal contact spots are obtained as described in the book "Electrical Contacts", by Ragnar Holm, published by Hugo Gebers, Forlag, Stockholm, pp. 7–23. The addition of fine metal particles in the range of 200 to 500 mesh such that the resin is made semi-conducting improves the electrical connection around each contact spot by bridging the perimeter of the spot. More importantly, the metal filled epoxy resin fills all the void spaced between the strands and between connector and strands by the force of the compression tool. In so doing, heat is rapidly conducted away from the contact spots thereby lowering the operating temperature and reducing relative movement of contact spot surfaces caused by thermal cycling to a minimum.

We are aware that Redslob U.S. Pat. No. 2,815,497, and Wells U.S. Pat. No. 2,869,103 teach the use of fine metal particles in the 300 mesh range in soft grease joint compounds. Frant U.S. Pat. No. 3,243,758 teaches of 300 mesh nickel particles in grease or epoxy. Adelman U.S. Pat. No. 3,746,662 teaches the use of fine metal particles above 100 mesh size for conductive coatings and Saunders, et al, U.S. Pat. No. 3,491,056 teaches the use of fine metal particles to enhance the tensile and impact strength of polymers. Further, Miller, et al, U.S. Pat. No. 3,332,867 teaches the use of coarse metal particles in an epoxy adhesive to bond a galvanic anode to the hull of a ship in which current flow is through the metal particles and which gives a high resistance electrical connection on the order of 1,000 micro-ohms (0.001 ohm). However, we are unaware of anyone who teaches the improvement of electrical power compression connectors by the use of a hardenable epoxy or similar resin system containing the combination of fine metal particles in the 200 to 500 mesh range to obtain a semi-conductive material and of coarse metal particles in the 10 to 100 mesh range which act in synergism with the fine particles to clean oxide surfaces to obtain and maintain intimate metal-to-metal contact. In Miller, et al, teaching the two materials of their invention, the steel hull of the ship and the zinc anode are not in intimate metallic contact since the electrical contact is made only through a layer of scattered coarse particles which results in a contact resistance only as low as 1,000 micro-ohms, which is unsuitable for power cable.

The synergistic effect of the use of the disclosed mixture of fine and coarse metal particles in the hardenable resin is particularly evident in the ability of the joint to withstand repeated thermal load cycling, far beyond the obtainable with prior joints known to the industry.

DETAILED DESCRIPTION

Figure 1:
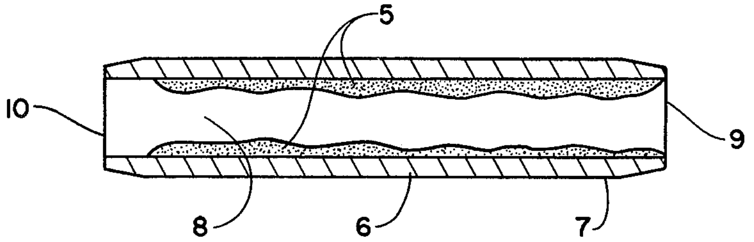
FIG. 1 is a longitudinal cross-sectional view of an electrical power cable compression connector containing the electrical joint compound of the present invention.
Figure 2:
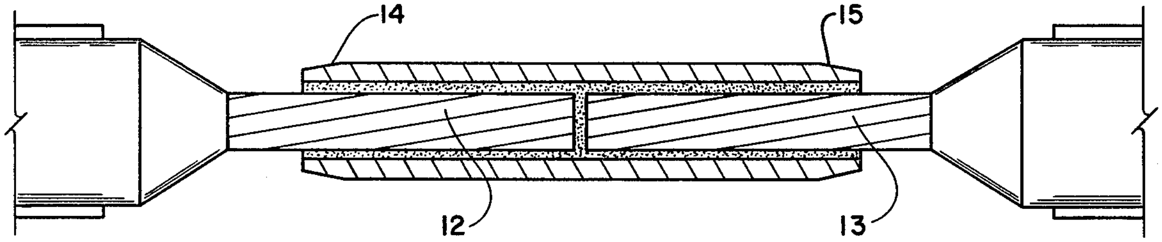
FIG. 2 is a longitudinal cross-sectional view of the electrical power cable compression connector of FIG. 1 having the electrical power cable conductor inserted therein.

Referring to the drawings, in FIG. 1, the electrical joint compound 5 is disposed within the connector indicated generally at 6 which comprises of a malleable metal tubular body 7 provided with an axial cylindrical hole 8 extending therethrough. In FIG. 2, the conductors 12 and 13 are coated with the compound and inserted into the connector until they abut in the center, or inserted without prior coating into the body 7 which has been provided with the fluid resin as indicated at 5 in FIG. 1.

In FIG. 2 the ends of the conductors 12 and 13 are illustrated as separated, and it is to be understood that while the ends preferably are in substantial abutment, they may be slightly separated, since conductance may be essentially through the tubular body or sleeve 7.

Figure 3:
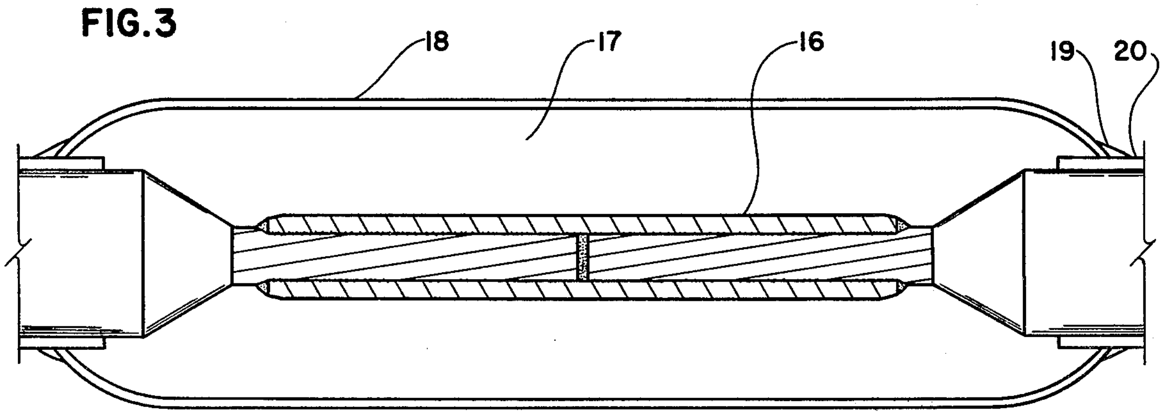
FIG. 3 is a longitudinal cross-sectional view of the connector and conductors of FIG. 2 with the connector being in a crimped or compressed state and covered with insulation and outer metal sheath.

The connector 6 is made of a malleable metal such as aluminum, copper and the like and has a uniform outer diameter throughout most of its axial length with chamfered ends 14, 15. In FIG. 3, the connector 16 has been uniformly crimped half lapped and the connector and conductor diameters have been reduced and their length increased. The excess electrical joint compound squeezed from the joint is wiped away and insulation is applied in the space 17 over the joint within the sleeve 18, which is slipped over the joint and connected generally by soldering 19 to the conductor sheath 20.

The polymeric resin compound consists of a fluid but hardenable resin system such as uncured epoxy and hardener, or polyester resin with peroxide hardener, to which has been added a uniformly dispersed mixture of fine and coarse metal particles.

The fine particles are within the range of 200–500 mesh, and the coarse particles are within the range of 10–100 mesh. The ratio of the weight of coarse to fine particles (C/F) is between 1/20 and 1/1, and preferably about 1/4. The ratio of the weight of all particles both coarse and fine to the resin (P/R) is between 3/2 and 6/1 and preferably about 5/1. The addition of particles to the fluid resin is such as to produce a viscosity of 3,000 to 15,000 centipoise at 25 degrees Centigrade. When the resin and metal particles mixture is cured its Rockwell R hardness is 105–125 and preferably between 110–120. The coarse particles should be irregularly shaped with sharp edges and a preferred material consists of 50—50 nickel-aluminum alloy but can be iron, nickel, copper or a combination of these or other metals.

The fine metal particles preferably consist of de-oxidized copper but can be other highly conductive metal powders. The combination of all three materials, a hardenable resin system, coarse metallic particles, and fine metallic particles with the resin made semi-conductive are all required to enable a relatively short compression connector joint in large conductors to have a long service life.

These three materials in combination act synergistically in the following manner. The electrical conductance is first established at a high value by the scouring action of the coarse particles during compression of the connector. Contact spots are established in which many metal-to-metal contacts are made between connector and conductor strands and between the strands themselves.

The initial compression is made in the center of the connector for underground cable 1 million circular mil and larger. The compression tool has a die width of up to several inches. Compressions are contained on each side of center with 50 percent overlap until the end of the connector is reached. As the compression proceeds, the polymeric resin compound is extruded between and around the strands and connector. The diameter of the connector and conductor is reduced somewhat under the crushing action of the die. The compound fills any and all of the void spaces in the process. The semi-conducting nature of the resin compound assists the electrical connection in several ways. The compound bridges the contact spots in all areas and thin film as well as metallic conduction takes place. Secondly, the high thermal conductivity of the metal-filled resin removes heat from the contact spots where the bulk of the current flow takes place. The thermal conductivity of the resin alone is only 1.16 Btu per hour per foot square per °F. per inch thickness and is improved with the metal particles to 22 Btu per hour per foot square per °F. per inch thickness or by a factor of 19.

By cooling the contact spots, relative movement of the spots is minimized. Such movement occurs in connectors without the resin compound and allows the contact spots to ride up onto oxide coated areas and the metal area formerly in contact becomes oxidized so that a return to the original spot also results in oxide contacts and a building up of a high resistance connection. The hard resin in which the coarse and fine metallic particles are contained restricts the movement of the connector joint thus maintaining the original low resistance connection. Further, the resin compound in filling all the void spaces excludes air which might otherwise oxidize the contact spots. Since the resin after hardening does not migrate its use in underground cable is acceptable unlike grease compounds which can and do migrate.

The thermosetting resin may be epoxy, acrylic, polyester, silicone, polyurethane, polysulfide, polyolexins, or others. The selection of the resin from known and commercially available resins depends on temperature resistance, dimensional stability, the ability to form a paste or fluid with the required percentages of the metal particle mixture having the required viscosity, chemical inertness, resistance to moisture, and of first importance, a hardness when cured or polymerized in the joint with the metal particles within the required range.

Epoxy resin has been thoroughly tested, and found to be very satisfactory. A particular epoxy resin used was a dyglycidyl ether of bisphenol A with a curing agent which was a primary aliphatic amine, specifically ethylene diamine. The epoxy and hardener is available from Ren Plastics, of Lansing, Mich., as high temperature epoxy resin and hardener R P4002A.

Polyester resin using MEK as a hardener has been found also to be suitable. Such a resin is available from Cooks Paint Company under their designation 939×800.

The tubular connectors are selected to have a wall cross-sectional area of 0.75–1.25 that of the conductors being joined.

Reference is made herein to the fact that the fine metal particles make the mixture with the resin semi-conductive. By this term applicants herein refer to a resistance value of 0.01–100 ohm-cm.

The initial internal diameter of connector 7 is made larger than the maximum outside diameter of the bare conductors by only an amount which permits the conductor to be freely inserted, opposed only by the force necessary to displace excess compound.

Examples are given below of the performance of the present invention compared with compression connector joints containing grease having therein coarse sharp particles of nickel-aluminum alloy. In example 4, joints made with the present invention are compared with clean connector joints. The statistical tables accompanying each example gives the results of electrical current load cycle tests of compression connectors in terms of how well the joint will conduct electricity with respect to how well an equal length of conductor will conduct electricity and the term is called percent conductance. Joints having values of 100 percent are equal in conductance to that of the conductor and joints above 100 percent are satisfactory and the higher this value the better the joint. Joint values below 100 percent conductance are unsatisfactory and will operate hotter than the conductor and will eventually fail.

EXAMPLE 1

Compression connectors 2 inches in length were pressed on No. 0 Awg, 7-strand, bare, aluminum conductor and subjected to current load cycle tests. Three connectors in each group were tested. The control groups consisted of connectors containing the following: (1) clean, (2) grease with coarse metallic particles of nickel-aluminum alloy, (3) epoxy with coarse metallic particles of copper and fine non-metallic particles of silica, (4) epoxy with fine non-metallic particles of silica. These four types of joints were compared with the present invention of connectors containing epoxy with both coarse and fine metallic particles of copper. The epoxy was made semi-conductive by virtue of loading with the fine copper particles. Samples of connectors containing only the cured epoxy resin were included in the program to show its low initial conductance.

The compound made in accordance with the present invention was:

| | Parts by Weight |
|---|---|
| Ren Plastic high temperature epoxy and hardener RP 4002a | 1.0 |
| Coarse particles, 30 mesh copper | 1.0 |
| Fine particles, 500 mesh deoxidized copper | 4.0 |

Three samples of connectors as previously outlined were connected in a loop and current load cycle following the Edison Electric Institute-National Electrical Manufacturers (EEI-NEMA) Standard for Overhead Connectors for the Use Between Aluminum or Copper Conductors (EEI Pub. No. TDJ-162). Each load cycle consisted of 2 hours of heating and 2 hours of cooling in a room temperature ambient. The electric current circulated in the loop raised the conductor temperature to 100 C. After 500 load cycles at 100 C. rise in conductor temperature the test was extended beyond EEI-NEMA requirements to 500 cycles at 125 C. rise followed by 350 cycles at 150 C. rise. The test results are shown in Table I.

Conductivity of Aluminum Compression Connectors in No. 0 Awg, 7-Strand, Bare Conductor

| | | | Average Percent Conductance | |
|---|---|---|---|---|
| Base Material | Coarse Particles | Fine Particles | Initial | After 1350 Load Cycles |
| None | none | none | 81 | 72 |
| grease | nickel-aluminum | none | 146 | 56 |
| epoxy | none | none | 45 | — |
| epoxy | none | silica | 110 | 96 |
| epoxy | copper | copper | 155 | 180 |

The results show that clean connectors were not satisfactory initially and became worse in load cycling. The grease compound was initially good but after repeated load cycles these connectors failed. Epoxy alone was poor at only 45 percent conductance and this low value was apparently due to the lubricity which prevented the crushing of the oxide film. The best connector joints were those of the present invention of epoxy containing coarse and fine metal particles. The test showed that coarse metallic particles with non-metallic fine particles or fine metallic particles in epoxy have poorer conductance than the connectors of the present invention and that such connectors deteriorate with load cycles, whereas conductance of connectors of the present invention actually increased with load cycles.

EXAMPLE 2

Compression connectors 2 inches in length were used to join No. 0 Awg, 7-strand, aluminum conductor and subjected to similar load cycle tests as in Example 1. Three connectors in three groups were tested. Two control groups consisted of one group of clean connectors and a second group of connectors containing grease compound having course metallic particles of nickel-aluminum alloy. The third group of connectors of the present invention contained the compound of Example 1, i.e., epoxy plus coarse and fine metallic particles of copper.

Table II

Conductivity of Aluminum Compression Connectors Joining No. 10 Awg Solid, Copper Conductor to No. 0 Awg, 7-Strand, Aluminum Conductor

| Connector Treatment | Current Load Cycles | Average Percent Conductance* |
|---|---|---|
| NONE | Initial | 30 |
| | 500 cycles, 100C rise | 37** |
| | 500 cycles, 125C rise | 40** |
| | 350 cycles, 150C rise | 28 |
| Grease with coarse metallic particles | Initial | 20 |
| | 500 cycles, 100C rise | 20 |
| | 500 cycles, 125C rise | 22* |
| | 350 cycles, 150C rise | 40 |
| Epoxy with coarse and fine metallic particles | Initial | 205 |
| | 500 cycles, 100C rise | 203 |
| | 500 cycles, 125C rise | 199 |
| | 350 cycles, 150C rise | 196 |

*Copper half of connector joint
**Thermal run away of sample

The control groups of clean connectors and greased connectors failed the test since they had very low percent conductances initially throughout the load cycle test for the copper half of the joint. Two of the clean samples and one of the greased samples were removed from the test loop because they overheated and all the other clean and greased samples were hotter than the copper conductor. In sharp contrast the group of samples of the present invention had very high initial percent conductance which stayed high throughout the load cycles. Joint temperatures were lower than the copper conductor temperature. This test showed the excellent results obtained with the present invention when used in aluminum to copper joints.

EXAMPLE 3

This example shows that joining large size copper conductors to large size aluminum conductors can give excellent joints with the present invention. The control connectors are pressed with grease compound containing coarse metallic particles of nickel-aluminum. The samples of the present invention used in the compound of Example 1, (i.e.) epoxy compound made semi-conductive by use of fine metallic particles of copper and also contains coarse metallic particles of copper. The conductors joined were 350 thousand circular mil (Kcm), 37 strand, copper conductor and 750 Kcm, 63 strand, aluminum conductor. The aluminum connector length after pressing was 9 inches. Three compression connector joints in each group were subjected to 1100 current load cycles of 2 hours of heating and 2 hours of cooling. In the heating part of the cycle the smaller size conductor (copper) was limited to a temperature rise of 100 C. above room temperature of 25 C. Test results are shown in Table III.

Table III

| Connector Treatment | Current Load Cycles | Percent Conductance of Sample 1 | 2 | 3 | Cycles to Thermal Failure of Sample 1 | 2 | 3 |
|---|---|---|---|---|---|---|---|
| Grease with coarse metallic particles | Initial | 177 | 173 | 212 | | | |
| | 250 | 115 | 100 | 138 | | | |
| | 500 | 83 | 89 | 127 | 500 | | |
| | 1100 | — | — | 96 | | 550 | 1100 |
| Epoxy with coarse and fine metallic particles | Initial | 243 | 235 | 206 | | | |
| | 250 | 240 | 232 | 196 | | | |
| | 500 | 230 | 229 | 188 | | | |
| | 1100 | 230 | 226 | 188 | | | |

The test results show that the connectors of the present invention have high percent conductance and remain stable whereas those made with conventional grease compounds deteriorate and eventually fail by overheating.

EXAMPLE 4

Tests were made of aluminum connectors 9½ inches long joining four-sector, compact-strand, 2,250 Kcm aluminum oil-impregnated, underground cable using the present invention. The control group were connectors having no treatment since grease compound would migrate in insulated cable and cause failure by ionization. Three cable joints in each group were tested. The connectors of the present invention used the compound described in Example 1.

| | Parts by Weight |
|---|---|
| Ren Plastic high temperature epoxy and hardener RP 4002a | 1.0 |
| Coarse particles, 30 mesh copper | 1.0 |
| Fine particles, 500 mesh deoxidized copper | 4.0 |

The cable samples containing a joint were 6 feet in length. The control samples were connected to one loop and samples of the present invention were connected in a second loop. The cable and joints were insulated with a 1-inch layer of aluminum silicate blanket insulation. The loops were installed in a refrigerated room maintained at 0 C. A current of 1210 amperes was circulated in the loops to raise the cable temperature to 100 C. A heating cycle was 12 hours long and a cooling cycle was 12 hours long. A total of 200 load cycles was conducted on the samples of the present invention at 100 C. The current in each loop was then raised to 1,320 amperes to bring the maximum conductor temperature to 125 C. An additional 150 current load cycles were conducted on each group. The test of the control group was terminated due to thermal failure at 150 cycles, and the epoxy group was still in excellent condition after 285 cycles at 125 C. rise in conductor temperature. The test results are shown in Table IV.

Table IV

Conductance of Aluminum Compression Connectors Joining 2250 Kcm, Compact-Strand, Aluminum Cable

| Connector Treatment | Current Load Cycles | Percent Conductance of Sample 1 | 2 | 3 |
|---|---|---|---|---|
| None | Initial | 100 | 95 | 92 |
| | 100 cycles, 100 C | 90 | 82 | 89 |
| | 200 cycles, 100 C | * | 70 | 68 |
| | 100 cycles, 125 C | — | * | 44 |
| | 150 cycles, 125 C | — | — | 40 |
| Epoxy with coarse and fine metallic particles | Initial | 179 | 135 | 177 |
| | 100 cycles, 100 C | 191 | 128 | 168 |
| | 100 cycles, 125 C | 203 | 128 | 138 |
| | 150 cycles, 125 C | 219 | 184 | 183 |
| | 200 cycles, 125 C | 210 | 178 | 165 |
| | 285 cycles, 125 C | 207 | 185 | 155 |

*Removed for tensile tests

The untreated connectors had low percent conductance which deteriorated with current load cycling. The temperature of the clean connectors continued to rise above the conductor temperature during the test. The connector joints of the present invention were initially high in conductance and did not appreciably change with the current loading cycling. The joint temperature initially and at 150 cycles at 125 C. rise was the same as that of the conductor. This test shows that the present invention can be used with short connectors for large size aluminum power cable which is a requirement of underground construction.

EXAMPLE 5

A compound suitable for producing the joints disclosed herein comprises, by weight, 1 part of polyester resin with MEK hardener (Cooks Paint Company 939×800), 3 parts of copper particles of approximately 300 mesh size, and 1 part of coarse copper particles of approximately 50 mesh.

EXAMPLE 6

A further compound suitable for producing the joints disclosed herein comprises by weight, 1 part of polyester resin with MEK hardener (Cooks Paint Company 939×800), 3 parts of copper particles of approximately 300 mesh size, and 0.5 parts of coarse copper particles of approximately 50 mesh.

EXAMPLE 7

A further compound suitable for producing the joints disclosed herein comprised by weight, 1 part of polyester resin with MEK hardener (Cooks Paint Company 939×800), 3.2 parts of copper particles of approximately 300 mesh size, and 0.5 parts of coarse copper particles of approximately 50 mesh.

EXAMPLE 8

A compound suitable for producing the joints disclosed herein comprises by weight, 1 part epoxy resin with ethylene diamine hardener, 3 parts of copper particles of approximately 300 mesh size, and 1 part of coarse copper particles of approximately 50 mesh size.

EXAMPLE 9

In addition, ten samples were prepared from 2,250 Kcm aluminum cable in which the joint compound was, by weight, 17.5% epoxy resin, 65% fine copper particles and 17.5% coarse aluminum nickel alloy, the particles being selected from the size ranges disclosed herein.

The ten samples were tested for percentage conductance after 100 load cycles in which the temperature was raised to 150° centigrade, a harsh test.

After the 100 load cycles the percentage conductance of the samples varied between 107 and 157%, establishing that the joint produced was very acceptable.

What we claim is:

1. A compression electrical-mechanical joint for electrically and mechanically connecting the bared ends of electrical power cables capable of carrying heavy current in power distribution systems, characterized in that the joint has an electrical conductance at least substantially equal to an equal length of conductor, capable of maintaining high conductance and mechanical strength over a very great number of thermal recyclings which comprises a connector body having a tubular portion, the bared end of an electrical conductor in said portion, a highly thermally conductive compound comprising a thermosetting hardened resin containing a uniformly dispersed mixture of fine and coarse metal particles, said fine particles being 200–500 mesh, said coarse particles being 10–100 mesh, the ratio by weight of coarse particles (C) to fine particles (F) being expressed by:

$$C/F-1/20 \text{ to } 1/1,$$

the ratio by weight of all metal particles (P) to resin (R) is expressed by:

$$P/R=3/2 \text{ to } 6/1$$

and in which the tubular metal portion has been compressed onto the cable end with a force intensity sufficient to have substantially reduced the diameter of the cable and to produce substantial contact between the inner surface of the connector body and outer surface portions of the conductor.

2. A joint as defined in claim 1, in which the resin is selected from the group consisting of epoxy, acrylic, polyester, silicone, polyurethane, polysulphide, and polyolexine resins.

3. A joint as defined in claim 1, in which the resin is epoxy resin.

4. A joint as defined in claim 1, in which the fine particles are copper.

5. A joint as defined in claim 1, in which the coarse particles are copper, iron, nickel, or nickel-aluminum alloy.

6. A joint as defined in claim 1, in which the coarse particles are 50-50 nickel-aluminum alloy.

7. A joint as defined in claim 1, in which the resin is epoxy, the fine particles are copper and the coarse particles are copper, iron, nickel, or nickel-aluminum alloy.

8. A joint as defined in claim 1, in which the resin is epoxy, the fine particles are copper and the coarse particles are nickel-aluminum alloy.

9. A joint as defined in claim 1, in which the coarse particles are of irregular shape and have sharp edges.

10. A joint as defined in claim 6, in which the coarse particles are of irregular shape and have sharp edges.

11. A joint as defined in claim 8, in which the coarse particles are of irregular shape and have sharp edges.

12. A joint as defined in claim 1, in which the conductor is essentially aluminum.

13. A joint as defined in claim 1 in which the hardened resin has a hardness of 105–125 Rockwell R.

* * * * *